United States Patent [19]

Ackerley et al.

[11] 4,020,105

[45] Apr. 26, 1977

[54] OXIME

[75] Inventors: Norman Ackerley; Peter Albert Mack; David Harold Johnson, all of Manchester, England

[73] Assignee: Imperial Chemical Industries Limited, London, England

[22] Filed: Sept. 29, 1975

[21] Appl. No.: 617,393

[30] Foreign Application Priority Data

Sept. 30, 1974 United Kingdom ............ 42340/74

[52] U.S. Cl. .................... 260/566 A; 260/429 C; 260/429.7; 260/429.9; 260/430; 260/431; 260/438.1; 260/438.5 R; 260/439 R; 423/24; 423/100; 423/139
[51] Int. Cl.$^2$ .............. C07C 131/00; C07C 131/14
[58] Field of Search ............................... 260/566 A

[56] References Cited

OTHER PUBLICATIONS

Parish, "J. S. African Chem. Inst. vol. 23 pp. 129–135 (1970).

*Primary Examiner*—Gerald A. Schwartz
*Attorney, Agent, or Firm*—Cushman, Darby & Cushman

[57] ABSTRACT

5-Heptyl-2-hydroxybenzaldoximes in which the heptyl group is attached to the benzene ring through a tertiary carbon atom and particularly mixtures of such aldoximes are effective as extractants for metals such as copper from aqueous solutions. These aldoximes have a more rapid rate of metal transfer from aqueous to organic phase, and vice versa, than other alkylhydroxybenzaldoximes. The benzaldoximes may be prepared from the corresponding aldehydes by reaction with hydroxylamine.

2 Claims, No Drawings

OXIME

This invention relates to an improved process for extracting metals from aqueous solutions containing these metals and in particular to aldoximes used in said extraction process.

Our copending Application No. 13158/72 describes an improvement in the conventional hydrometallurgical process for extracting metals from aqueous solutions which comprises contacting an aqueous medium containing the metal in the form of, for example, a salt with a solution of a chelating agent in a water-immiscible solvent and separating the solvent phase containing a part of the metal in the form of a chelate compound. The metal can then be recovered from the solvent phase by conventional means such as stripping with acid solutions followed for example by electrowinning. The improvement of Application No. 13158/72 comprises the use as chelating agent of substituted salicylaldoximes, in particular the mixture of salicylaldoximes derived by formylation and oxime formation from the mixed nonylphenols obtained by condensation of phenol with propylene trimer. It has now been found that heptylsalicylaldoximes derived from heptylphenols are of especial value in this process in place of nonylsalicylaldoximes.

According to the invention there is provided a process for extracting metal values from aqueous solutions which comprises contacting the aqueous solution with a solution in a water-immiscible organic solvent of one or more 5-heptyl-2-hydroxylbenzaldoximes and separating from the aqueous phase the organic phase containing the metal in the form of a complex with the oxime.

The process may be applied to the extraction of any metal which is capable of forming a suitable lyophilic complex compound which is soluble in or wholly associated with the organic solvent. As examples of such metals there may be mentioned cobalt, nickel, vanadium, chromium, zinc, tin, cadmium, silver, gold, mercury, and, especially, copper.

The conditions, particularly pH, under which the process is used are chosen to suit the metal or metals present in the aqueous solution. It is generally desirable that under the chosen conditions any other metals present should not form stable complex compounds with the aldoxime in order that substantially only the desired metal is extracted from the aqueous solution. Since formation of the complex compound may involve the liberation of acid, it may be necessary to add e.g. alkali during the process to maintain the pH within the desired range in which the metal complex is stable. The aldoxime is especially suitable for the extraction of copper since this metal forms a complex which is stable at low pH values and by operating at pH below 3 copper can be extracted substantially free from iron, cobalt and nickel.

As organic solvent there may be used any mobile organic solvent or mixture of solvents which is immiscible with water and, under the pH conditions used, inert to water, to the metal, and to the ligands, especially aliphatic, alicyclic and aromatic hydrocarbons, and halogenated particularly chlorinated hydrocarbons including, as solvents more dense than water, highly halogenated hydrocarbons such as perchloroethylene, trichloroethane, trichloroethylene and chloroform. Other solvents such as esters or ethers may be used but may in some cases cause complications by metal complex formation.

In order to facilitate separation of the aqueous and solvent phases it is desirable to use a solvent having a significantly different density when containing the aldoxime and complex from that of the aqueous layer.

The process may conveniently be carried out by bringing together the aqueous solution and a solution of the aldoxime in the organic solvent at a suitable temperature, conveniently ambient temperature, agitating or otherwise disturbing the mixture of liquids so that the area of the water-solvent interfacial layer is increased in order to promote complex formation and extraction, and then decreasing the agitation or disturbance so that the aqueous and solvent layers settle and can be conveniently separated. The process may be carried out in a batchwise manner or preferably continuously, in either case the solvent being if desired stripped of the metal content before re-use.

The amount of organic solvent to be used may be chosen to suit the volume of aqueous solution to be extracted, the concentration of metals, and the plant available to carry out the process. It is not in general necessary to use an amount of solvent sufficient to ensure complete solution of the complex formed, since any complex in excess of that in solution will usually remain as a suspension in the organic solvent and will not interfere with the handling and separation of the solvent layer, especially if this is more dense than the aqueous layer. It is preferred, especially when operating the process continuously, to bring together approximately equal volumes of the organic solution and the aqueous solution.

If desired mixtures of aldoxime and other ligands may be used, and other compounds, such as conditioners for example long chain aliphatic alcohols such as a capryl alcohol, isodecanol, tridecyl alcohol or 2-ethylhexanol which assist or modify the formation and extraction of the complex compound, may also be present, suitably in amounts of from 0.5 to 10% by weight of the organic solvent.

The addition of surface active agents such as ethylene oxide/alkyl phenol condensates is sometimes desirable in order to assist separation of the aqueous and organic phases by reducing any tendency to emulsification.

It is preferred to use solvent solutions containing from 2 to 50% of the aldoxime.

The metal may be isolated from the solvent after the extraction stage by any conventional process, for example by extraction into an aqueous phase under pH conditions in which the complex is unstable, or by hydrogenation. Such treatment will regenerate the aldoxime and the solvent containing the aldoxime so recovered may conveniently be re-used in the process, especially when operated continuously.

The process of the invention may be applied especially to aqueous solutions resulting from treatment of mineral ores, scrap metal or other metal-containing residue with aqueous acids such as sulphuric, sulphurous, hydrochloric, or nitric acids or for example with aqueous ammonia, ammonium carbonate or to metal containing spent liquors from electrolytic or chemical processes. It is in general particularly suitable for the recovery of copper from solutions containing at least 5 g of copper per liter.

The process of the invention is of particular value because of the high rate at which 5-heptyl-2-hydroxybenzaldoxime forms metal complexes under extraction conditions and is regenerated from metal complexes under stripping conditions. This high reaction rate enables economies to be made by the use of smaller plant at both extraction and stripping stages and is of particular importance when extraction or stripping stages are carried out in column contactors.

According to the invention there are also provided new 5-heptyl-2-oxybenzaldoximes and mixtures of such compounds.

As heptyl groups there may be mentioned any alkyl group containing seven carbon atoms, but especially branched alkyl groups and particularly such groups in which the carbon atom attached to the benzene ring is a tertiary carbon atom.

Of particular value in the process of the invention are mixtures of 5-heptyl-2-oxybenzaldoximes differing in the configuration of the heptyl group, especially such mixtures obtained by formylation and conversion to oxime of commercial 4-heptylphenol mixtures containing as major components at least four isomers in which the carbon atoms attached to the benzene ring are tertiary since these mixtures of oximes and the metal chelate compounds from them have a high solubility in water-immiscible organic solvents.

The 5-heptyl-2-hydroxybenzaldoximes may be obtained by conventional means from the corresponding 5-heptyl-2-hydroxybenzaldehydes by reaction with hydroxylamine, for example as hydrochloride, in presence of sodium acetate. The 5-heptyl-2-hydroxy benzaldehydes may be obtained from 4-heptylphenols by conventional means for introducing formyl groups into ortho position of a 4-alkylphenol, for example by the use of formaldehyde and nitrosodimethylaniline.

The invention is illustrated but not limited by the following Examples in which all parts and percentages are by weight unless otherwise stated.

EXAMPLE 1

A mixture of 144 parts of commercial grade 4-heptylphenol wherein the heptyl group is a mixture of at least four branched chain isomers in which the carbon atom attached to the benzene ring is a tertiary carbon atom, 130.7 parts of 4-nitroso-N,N-dimethylaniline, 51 parts of paraformaldehyde, 265 parts of methanol, 108.4 parts of water, and 235.0 parts of concentrated sulphuric acid was boiled gently under reflux (60°–65° C) for 16–20 hours. After being cooled, the well-stirred dark brown reaction mixture was treated with 330 parts of 18% sulphuric acid solution and then hydrolysed by heating at 40°–45° C for 1 hour. The cooled hydrolysate was then diluted with 250 parts of water and extracted with light petroleum (6 portions, each of 150 parts). The dark coloured petrol extract was washed with 18% sulphuric acid solution (2 portions, each of 250 parts) and then with water (250 part portions) until acid-free, and after being dried over magnesium sulphate the solvent was evaporated under reduced pressure to yield 149.5 parts of a dark-brown viscous oil. Distillation of this product under high vacuum afforded 85.4 parts of a viscous yellow oily distillate, boiling from 104° C/0.8 mm to 132° C/0.4 mm, and there remained 59.5 parts of involatile distillation residue. Gas-liquid chromatographic analysis of the distillate showed it to contain 82.2 parts of mixed 5-heptyl-2-hydroxybenzaldehydes, corresponding to a 49.8% yield on 4-heptylphenol charged.

When the distillate was combined with 88.3 parts of similar product from a second experiment and then fractionally distilled, 3 fractions were obtained:

a. 13.0 parts of a forerun, boiling at 86°–91° C/0.16 mm.
b. 152.4 parts of essentially pure 5-heptyl-2-hydroxybenzaldehyde boiling at 91°–93° C/0.16 mm, and
c. 18.0 parts of higher boiling material, boiling at 93°–127° C/0.16 mm.

Fraction (b) was converted to 5-heptyl-2-hydroxybenzaldoxime as follows:

A mixture of 75 parts of mixed 5-heptyl-2-hydroxybenzaldehydes, 95.0 parts of hydroxylamine hydrochloride, 134 parts of potassium acetate and 400 parts of ethanol was boiled under reflux for 2 hours. After being cooled the mixture was filtered to remove inorganic salts which were washed on the filter with ethanol (2 portions each of 100 parts), and the combined filtrate and washings then were evaporated under reduced presssure to remove the ethanol. A solution of the residual oil in chloroform (900 parts) was washed with saturated sodium hydrogen carbonate solution (50 part portions) until acid-free, and then with water (6 portions each of 100 parts). After being dried over magnesium sulphate, the chloroform solution was evaporated under reduced pressure finally by heating at 75° C under a pressure of 20 mm of mercury. The product comprised 79.9 parts of a clear, viscous yellow oil shown by its uptake of copper from a solution of cupric ions buffered at pH 4.0, to contain 78.7 parts of mixed 5-heptyl-2-hydroxybenzaldoximes.

EXAMPLE 2

Solutions in Escaid 100 containing 0.315 g molar amounts of 5-heptyl-2-hydroxybenzaldoxime were stirred in various amounts for 15 minutes at 23° C with aqueous solutions containing 10.15 g of copper in the form of coper sulphate, 10 g of sulphuric acid and 150 g of magnesium sulphate (containing 3–4 mol of water of crystallisation) per liter. The stirring was stopped, the aqueous and organic phases separated, and portions of each analysed for copper to determine the amount of copper which would be present in the organic phase in equilibrium with an amount of copper in the aqueous phase under the conditions employed. These conditions approximate to those which may typically be met at the extraction stage in a conventional hydrometallurgical extraction process.

The results obtained are given below and indicate that the mixed 5-heptyl-2-hydroxybenzaldoximes are capable of extracting high amounts of copper from aqueous solutions.

| Volume (ml.) of Aqueous Phase | Volume (ml.) of Organic Phase | Copper Content (g.l.) at Equilibrium of | |
|---|---|---|---|
| | | Aqueous Phase | Organic Phase |
| 30 | 60 | 0.40 | 5.01 |
| 30 | 40 | 0.82 | 7.01 |
| 40 | 40 | 1.93 | 8.22 |
| 40 | 30 | 3.84 | 8.82 |
| 40 | 20 | 5.90 | 9.21 |
| 75 | 25 | 7.21 | 9.40 |

EXAMPLE 3

The procedure of Example 2 was repeated using an aqueous solution containing 30 g per liter of copper as sulphate and 150 g per liter of sulphuric acid and an Escaid 100 solution similar to that used in Example 2 but which had been contacted with aqueous copper sulphate solution until loaded with about 9 g per liter of copper.

These conditions approximate to those which may typically be met at the stripping stage of a conventional hydrometallurgical extraction process.

The results obtained are given below and indicate that the copper complex of the mixed 5-heptyl-2hydroxybenzaldoximes is readily stripped of its copper by suitably acidic aqueous media.

| Volume (ml.) of Aqueous Phase | Volume (ml.) of Organic Phase | Copper Content (g./l.) at Equilibrium of | |
|---|---|---|---|
| | | Aqueous Phase | Organic Phase |
| 60 | 30 | 32.72 | 5.68 |
| 40 | 40 | 34.38 | 5.83 |
| 20 | 40 | 38.25 | 6.15 |
| 15 | 50 | 42.89 | 6.51 |
| 10 | 50 | 45.49 | 6.77 |

EXAMPLE 4

75 ml of the Escaid 100 solution used in Example 2 were stirred at 22° C with 50 ml of the aqueous solution used in Example 2 using a paddle-type stirrer rotating at 900 r.p.m. After 30 seconds the stirring was stopped, the aqueous and organic phases separated, and the copper content in each determined. The figures obtained, together with those contained at equilibrium determined as described in Example 2, were as follows:

| | Initial | After stirring | Equilibrium |
|---|---|---|---|
| Organic phase (g./l.) | 0 | 5.41 | 6.48 |
| Aqueous phase (g./l.) | 10.15 | 1.96 | 0.63 |

These figures indicate that after 30 seconds the extraction has progressed to 83.5% of the equilibrium value as shown by the copper content of the organic phase and to 86.0% of the equilibrium value as shown by the copper content of the aqueous phase. The mean of these is 84.75%.

A similar procedure was carried out using mixed 5-nonyl-2-hydroxybenzaldoximes of Application No. 13158/72 instead of mixed 5-heptyl-2-hydroxybenzaldoximes. The figures were as follows:

| | Initial | After stirring | Equilibrium |
|---|---|---|---|
| Organic phase (g/l) | 0 | 4.194 | 6.22 |
| Aqueous phase | 10.15 | 3.978 | 0.839 |

These figures correspond to 67.4% of equilibrium value at 30 seconds (organic phase) and 66.3% (aqueous phase), giving a mean of 66.85%.

Comparison of these figures indicates that under otherwise similar conditions the heptyl compounds would require less drastic agitation or smaller plant than the nonyl compounds in order to attain a satisfactory degree of extraction of copper.

EXAMPLE 5

The procedure of Example 4 was applied to the aqueous solution and loaded Escaid 100 solution used in Example 3. The copper contents were as follows:

| | Initial | After stirring | Equilibrium |
|---|---|---|---|
| Organic phase (g/l) | 9.53 | 6.10 | 5.91 |
| Aqueous phase (g/l) | 30.499 | 35.39 | 34.46 |

These figures indicate that stripping has proceeded to 94.75% of the equilibrium value (organic phase) or 98.7% (aqueous phase), giving a mean of 96.7%.

A similar procedure using mixed 5-nonyl-2-hydroxybenzaldoximes instead of mixed 5-heptyl-2-hydroxybenzaldoximes afforded these figures:

| | Initial | After stirring | Equilibrium |
|---|---|---|---|
| Organic phase (g/l) | 9.28 | 7.52 | 5.13 |
| Aqueous phase (g/l) | 30.499 | 33.17 | 36.85 |

These figures correspond to 42.4% of equlibrium value (organic phase), 42.0% (aqueous phase), and 42.2% (mean).

Comparison indicates the superiority of the heptyl compounds over the nonyl compounds in speed of stripping under comparable conditions.

EXAMPLE 6

The procedures of Example 4 and 5 were repeated replacing the Escaid 100 by a commercially available mixed alkylbenzene solvent. The results obtained were as follows:

Mixed 5-heptyl-2-hydroxybenzaldoxime after 30 seconds contacting gave an extraction of 55% of equilibrium and stripping of 58% of equilibrium.

Mixed 5-nonyl-2-hydroxybenzaldoxime gave an extraction of 54.7% of equilibrium and stripping of 38% of equilibrium.

We claim:
1. 5-Heptyl-2-hydroxybenzaldoximes in which the heptyl group is attached to the benzene ring through a tertiary carbon atom.
2. Mixtures of 5-heptyl-2-hydroxybenzaldoximes as claimed in claim 1.

* * * * *